United States Patent

Takahashi et al.

[11] Patent Number: 5,320,991
[45] Date of Patent: Jun. 14, 1994

[54] MICROWAVE DIELECTRIC CERAMIC COMPOSITION

[75] Inventors: Hisakazu Takahashi; Kenichi Ezaki; Yoko Baba, all of Osaka; Kenichi Shibata, Wakayama, all of Japan

[73] Assignee: Sanyo Electric Co., Ltd., Moriguchi, Japan

[21] Appl. No.: 89,434

[22] Filed: Jul. 12, 1993

[30] Foreign Application Priority Data

| Jul. 17, 1992 | [JP] | Japan | 4-190712 |
| Aug. 20, 1992 | [JP] | Japan | 4-221580 |
| Oct. 8, 1992 | [JP] | Japan | 4-270261 |
| Feb. 1, 1993 | [JP] | Japan | 5-014747 |
| Feb. 16, 1993 | [JP] | Japan | 5-026728 |

[51] Int. Cl.$^5$ ............................................. C04B 35/46
[52] U.S. Cl. .................................... 501/136; 501/134
[58] Field of Search ............... 501/137, 152, 136, 138, 501/139, 134

[56] References Cited

U.S. PATENT DOCUMENTS

| 4,338,403 | 7/1982 | Kawashima et al. | 501/136 |
| 4,357,426 | 11/1982 | Murata et al. | 501/136 |
| 4,438,214 | 3/1984 | Masuyama et al. | 501/136 |
| 4,547,314 | 10/1985 | Masuyama et al. | 501/136 |
| 4,897,219 | 1/1990 | Noi et al. | 501/136 |
| 4,987,107 | 1/1991 | Narumi et al. | 501/136 |
| 5,188,993 | 2/1993 | Takahashi et al. | 501/136 |

FOREIGN PATENT DOCUMENTS

| 0059108 | 6/1974 | Japan | 501/139 |
| 0095673 | 7/1980 | Japan | 501/139 |

*Primary Examiner*—Mark L. Bell
*Assistant Examiner*—Deborah Jones
*Attorney, Agent, or Firm*—Armstrong, Westerman, Hattori, McLeland & Naughton

[57] ABSTRACT

The present invention is characterized in that in order to obtain a microwave dielectric ceramic composition having a high dielectric constant ($\epsilon$) and a large Q value and having a temperature coefficient ($\tau f$) which is close to zero, calcium oxide and strontium oxide, sodium oxide or lead oxide which are mixed with each other in an adjusted ratio are added to lithium oxide, samarium oxide and titanium oxide.

7 Claims, No Drawings

MICROWAVE DIELECTRIC CERAMIC COMPOSITION

BACKGROUND OF THE INVENTION

1. Field of the Invention

The present invention relates to dielectric ceramic compositions for use as resonators employed in a microwave frequency band of several gigahertz.

2. Description of the Prior Art

The recent increase in information density results in a progressively increased signal frequency used. Particularly, a microwave having a frequency of several hundred megahertz to several gigahertz is used in various information transmission media such as satellite communication, microwave remote communication, broadcasting, and further a microwave remote recognition system.

A resonator or a filter for a transmitter-receiver is indispensable in the media, and is manufactured using a dielectric ceramic material adequately performing a function in its high frequency band.

Examples of this type of dielectric ceramic material conventionally used include dielectric ceramic materials of a $BaO$ - $TiO_2$ system, a $Ba\{Zn_{\frac{1}{3}}(Nb.Ta)_{170}\}O_3$ system, a $(Zr.Sn)TiO_4$ system, and the like for the reason that the frequency characteristics are relatively good.

In the resonator or the like manufactured using the dielectric ceramic material, if the dielectric constant of its dielectric is taken as $\epsilon$, the wavelength of an electromagnetic wave propagating through the dielectric is small, i.e., $$1/\sqrt{\epsilon}.$$

Consequently, the higher the dielectric constant ($\epsilon$) of the material used is, the smaller the size of the electronic component such as the resonator can be.

However, the dielectric constant of the above described dielectric ceramic material is generally low, i.e., 20 to 40. Accordingly, the size of the resonator is increased in a microwave frequency band of 1 to 3 GHz.

Examples of a dielectric ceramic material having a higher dielectric constant ($\epsilon$) than the above described dielectric ceramic material include $SrTiO_3$ ($\epsilon$; about 300) and $CaTiO_3$ ($\epsilon$; about 180). The temperature coefficients of resonance frequency ($\tau f$) of the materials are respectively very high, i.e., +1700 ppm/° C. and +800 ppm/° C., so that the stable use cannot be expected.

Therefore, examples of a method of developing a dielectric ceramic material having a high dielectric constant and having a temperature coefficient which is close to zero include a method of mixing a dielectric ceramic material having a high dielectric constant and having a temperature coefficient which is large on the positive side and a dielectric ceramic material having a high dielectric constant and having a temperature coefficient which is large on the negative side. Examples of a material developed in such a method include a dielectric ceramic material of a $LiO_2$ - $CaO$ - $E_2O_3$ - $TiO_2$ system (where B is Sm or Nd) which is disclosed in U.S. Pat. No. 5,188,993. In putting the dielectric ceramic material to practical use, however, a material having a temperature coefficient which is close to zero, having such a Q value as not to interfere with practical use, and having a higher dielectric constant and a material having three characteristics such as a dielectric constant, a temperature coefficient and a Q value which are flexibly varied depending on the use have been required at the present time.

SUMMARY OF THE INVENTION

Therefore, an object of the present invention is to obtain a dielectric ceramic composition having a high dielectric constant and a large Q value and having a temperature coefficient of resonance frequency ($\tau f$) which is close to zero.

A first microwave dielectric ceramic composition according to the present invention is characterized by being expressed by a composition formula of $w.Li_2O - x\{(1 - u).CaO - u-.SrO\}- y.Sm_2O_3 - z.TiO_2$.

In the above described composition formula, the ranges of w, x, y and z are respectively 0 mole % < w < 100 mole %, 0 mole % < x < 100 mole %, 0 mole % < y < 100 mole %, and 0 mole % < z < 100 mole %, where w+x+y+z=100 mole %. More preferably, the ranges of w, x, y and z are respectively 0.0 mole % < w ≦ 25.0 mole %, 0.0 mole % < x ≦ 50.0 mole %, 0.0 mole % < y ≦ 20.0 mole %, and 0.0 mole % < z ≦ 80.0 mole %. In addition, the range of u is 0.0 < u < 1.0.

If calcium oxide (CaO) and strontium oxide (SrO) which are mixed with each other in an adjusted ratio are further added to lithium oxide ($Li_2O$), samarium oxide ($Sm_2O_3$) and titanium oxide ($TiO_2$), a microwave dielectric ceramic composition having a high dielectric constant ($\epsilon r$) and a large Q value and having a low temperature coefficient ($\tau f$) is obtained. In this embodiment, samarium oxide may be replaced by neodymium oxide ($Nd_2O_3$).

Particularly, the increase in the content of strontium oxide brings about the increase in the dielectric constant ($\epsilon r$), while bringing about the decrease in the Q value. Accordingly, the above described adjustment of the mixture ratio is required.

Furthermore, a second microwave dielectric ceramic composition according to the present invention is characterized by being expressed by a composition formula of $w.Li_2O - x.\{(1 - u).CaO - u Na_2O\} - y.Sm_2O_3 - z.TiO_2$.

In the above described composition formula, the ranges of w, x, y and z are respectively 0 mole % < w < 100 mole %, 0 mole % < x < 100 mole %, 0 mole % < y < 100 mole %, and 0 mole % < z < 100 mole %, where w+x+y+z=100 mole %. More preferably, the ranges of w, x, y and z are respectively 0.0 mole % < w ≦ 25.0 mole %, 0.0 mole % < x ≦ 50.0 mole %, 0.0 mole % ≦ y ≦ 20.0 mole %, and 0.0 mole % < z ≦ 80.0 mole %. In addition, the range of u is 0.0 < u < 0.7.

By adding calcium oxide (CaO) and sodium oxide ($Na_2O$) which are mixed with each other in an adjusted ratio to lithium oxide ($Li_2O$), samarium oxide ($Sm_2O_3$) and titanium oxide ($TiO_2$), a microwave dielectric ceramic composition having a high dielectric constant ($\epsilon r$) and a large Q value and having a low temperature coefficient ($\tau f$) is obtained.

Particularly, the increase in the content of sodium oxide brings about the increase in the dielectric constant ($\epsilon r$) and the increase in the absolute value of the temperature coefficient ($\tau f$), while bringing about the decrease in the Q value.

Furthermore, a third microwave dielectric ceramic composition according to the present invention is characterized by being expressed by a composition formula of w.Li$_2$O - x.{(1 - u).CaO - u.PbO}- y.A$_2$O$_3$ - z. TiO$_2$.

In the above described composition formula, A is Sm or Nd, and the ranges of w, x, y and z are respectively 0 mole % < w < 100 mole %, 0 mole % < x < 100 mole %, 0 mole % < y < 100 mole %, and 0 mole % < z < 100 mole %, where w + x + y + z = 100 mole %. More preferably, the ranges of w, x, y and z are respectively 0.0 mole % < w ≦ 25.0 mole %, 0.0 mole % < x ≦ 50.0 mole %, 0.0 mole % < y ≦ 30.0 mole %, and 0.0 mole % < z ≦ 80.0 mole %. In addition, the range of u is 0.0 < u < 1.0.

Also by adding calcium oxide (CaO) and lead oxide (PbO) which are mixed with each other in an adjusted ratio to lithium oxide (Li$_2$O), samarium oxide (Sm$_2$O$_3$) or neodymium oxide (Nd$_2$O$_3$) and titanium oxide (TiO$_2$), a microwave dielectric ceramic composition having a high dielectric constant ($\epsilon$r) and a large Q value and having a low temperature coefficient ($\tau$f) is obtained.

Particularly, the increase in the content of lead oxide brings about the increase in the dielectric constant ($\epsilon$r) and the gradual decrease in the Q value.

Furthermore, a fourth microwave dielectric ceramic composition according to the present invention is characterized by being expressed by a composition formula of w.Li$_2$O - x.CaO - y {(1 - u) Sm$_2$O$_3$- u.A$_2$O$_3$}- z. TiO$_2$.

In the above described composition formula, A is Nd, La or Pr. In addition, the ranges of w, x, y and z are respectively 0 mole % < w < 100 mole %, 0 mole % < x < 100 mole %, 0 mole % < y < 100 mole %, and 0 mole % < z < 100 mole %, where w + x + y + z = 100 mole %. More preferably, the ranges of w, x, y and z are respectively 0.0 mole % < w ≦ 25.0 mole %, 0.0 mole % < x ≦ 50.0 mole %, 0.0 mole % < y < 30.0 mole %, and 0.0 mole % < z ≦ 80.0 mole %. In addition, the range of u is 0.0 < u < 1.0.

Also by adding calcium oxide (CaO) and neodymium oxide (Nd$_2$O$_3$), lanthanum oxide (La$_2$O$_3$) or praseodymium oxide (Pr$_2$O$_3$) which are mixed with each other in an adjusted ratio to lithium oxide (Li$_2$O), samarium oxide (Sm$_2$O$_3$) or neodymium oxide (Nd$_2$O$_3$) and titanium oxide (TiO$_2$), a microwave dielectric ceramic composition having a high dielectric constant ($\epsilon$r) and a large Q value and having a low temperature coefficient ($\tau$f) is obtained.

Particularly, the increase in the content of lanthanum oxide brings about the gradual increase in the dielectric constant ($\epsilon$r) and the gradual decrease in the Q value.

Furthermore, a fifth microwave dielectric ceramic composition according to the present invention is characterized by being expressed by a composition formula of w.Li$_2$O - x CaO - y.A$_2$O$_3$ - z TiO$_2$.

In the above described composition formula, A is Pr or Eu, and the ranges of w, x, y and z are respectively 0 mole % < w < 100 mole %, 0 mole % < x < 100 mole %, 0 mole % < y < 100 mole %, and 0 mole % < z < 100 mole %, where w + x + y + z = 100 mole %. More preferably, the ranges of w, x, y and z are respectively 0.0 mole % < w ≦ 25.0 mole %, 0.0 mole % < x ≦ 50.0 mole %, 0.0 mole % < y ≦ 30.0 mole %, and 0.0 mole % < z ≦ 80.0 mole %.

Also by adjusting the mixture ratio of lithium oxide (Li$_2$O ), calcium oxide (CaO), praseodymium oxide (Pr$_2$O$_3$) or europium oxide (Eu$_2$O$_3$) and titanium oxide (TiO$_2$), a microwave dielectric ceramic composition having a high dielectric constant ($\epsilon$r) and a large Q value and having a low temperature coefficient ($\tau$f) is obtained.

As described in the foregoing, according to each of the embodiments of the present invention, it is possible to obtain a microwave dielectric ceramic composition having a high dielectric constant ($\epsilon$) and a large Q value and having a temperature coefficient ($\tau$f) which is close to zero.

Consequently, the size of an electronic component such as a resonator constituted by the microwave dielectric ceramic composition can be reduced and the operation thereof is stabilized under the use conditions in which temperature changes are relatively large, thereby to make it possible to increase the reliability of the function of the electronic component.

The foregoing and other objects, features, aspects and advantages of the present invention will become more apparent from the following detailed description of the present invention.

DESCRIPTION OF THE PREFERRED EMBODIMENTS

In order to make the present invention clearer, suitable embodiments of the present invention will be described in detail. However, the present invention is not limited to the embodiments and also includes a range which is obvious from its true intent.

Description is now made of a microwave dielectric ceramic composition according to one suitable embodiment of the present invention which is expressed by a composition formula of w.Li$_2$O - x {(1 - u).CaO - u SrO}- y. Sm$_2$O$_3$ - z.TiO$_2$.

In manufacturing processes of the microwave dielectric ceramic composition according to the present embodiment, powders of Li$_2$CO, CaCO$_3$, SrCO$_3$, Sm$_2$O$_3$ and TiO$_2$ which are raw materials were first weighed and mixed so as to be predetermined molar fractions, respectively.

For example, as shown in a column of a sample number 7 in the following table 1, the powders are so weighed and mixed that the ratio u of CaO to SrO is 0.06, and the respective molar fractions w, x, y and z of Li$_2$O, a mixture of CaO and SrO, Sm$_2$O$_3$ and TiO$_2$ are 9 mole %, 16 mole %, 12 mole % and 63 mole %.

The mixed powder was then blended in a ball mill over 5 to 20 hours by the wet blending using alcohol and then, was calcined at temperatures of 700° to 1000° C. for 1 to 5 hours. Thereafter, the calcined powder thus obtained is ground using the ball mill for 2 to 50 hours.

The ground calcined powder was granulated after an organic binder such as polyvinyl alcohol was added thereto, was classified and then, was formed so as to have predetermined dimensions and a predetermined shape by applying a pressure of 2000 to 3000 kg/cm$^2$. A forming member obtained was sintered at temperatures of 1200° to 1400° C. for 1 to 5 hours and then, both surfaces of the sintered forming member were polished so that the thickness of the sintered forming member becomes approximately one-half of the diameter thereof, thereby to obtain a sample to be measured having the above described composition.

The dielectric constant ($\epsilon$r), the Q value and the temperature coefficient of resonance frequency ($\tau$f) in the neighborhood of the measurement frequency of 3 GHz were measured using the Hakki-Coleman method with respect to the sample to be measured. The results of the measurements are shown in Table 1.

Samples to be measured which differ in mixture ratio as shown in respective columns of the other sample numbers in Table 1 were prepared in the same manner, and the dielectric constant ($\epsilon r$), the Q value and the temperature coefficient of resonance frequency ($\tau f$) in the neighborhood of the measurement frequency of 3 GHz were measured using the Hakki-Coleman method with respect to the samples to be measured. Table 1 also shows the results of the measurements.

TABLE 1

Dielectric Properties of Ceramics of a $w \cdot Li_2O - x \cdot \{(1 - u) \cdot CaO - u \cdot SrO\} - y \cdot Sm_2O_3 - z \cdot TiO_2$ System

| sample number | u | composition ratio (mole %) | | | | $\epsilon r$ | Q | $\tau f$ |
| --- | --- | --- | --- | --- | --- | --- | --- | --- |
| | | w | x | y | z | | | |
| 1* | 0.00 | 7 | 17 | 13 | 63 | 98 | 1970 | −16 |
| 2 | 0.12 | 7 | 17 | 13 | 63 | 99 | 1810 | −13 |
| 3 | 0.41 | 7 | 17 | 13 | 63 | 107 | 1000 | −7 |
| 4 | 0.71 | 7 | 17 | 13 | 63 | 112 | 500 | −10 |
| 5* | 1.00 | 7 | 17 | 13 | 63 | 123 | 160 | −29 |
| 6* | 0.00 | 9 | 16 | 12 | 63 | 105 | 1510 | −4 |
| 7 | 0.06 | 9 | 16 | 12 | 63 | 107 | 1380 | +12 |
| 8 | 0.38 | 9 | 16 | 12 | 63 | 111 | 923 | +12 |
| 9 | 0.69 | 9 | 16 | 12 | 63 | 116 | 480 | +7 |
| 10* | 1.00 | 9 | 16 | 12 | 63 | 132 | 170 | 0 |
| 11* | 0.00 | 8 | 16 | 13 | 63 | 99 | 1910 | −31 |
| 12 | 0.06 | 8 | 16 | 13 | 63 | 100 | 1700 | −23 |
| 13 | 0.38 | 8 | 16 | 13 | 63 | 109 | 1040 | −7 |
| 14 | 0.69 | 8 | 16 | 13 | 63 | 118 | 500 | +4 |
| 15* | 1.00 | 8 | 16 | 13 | 63 | 131 | 250 | −58 |

Note) In Table 1, asterisked samples are samples beyond the range of the present invention, and the unit of $\tau f$ is ppm/°C.

As can be seen from Table 1, the dielectric constant ($\epsilon r$) is gradually increased as the content of strontium oxide is increased, that is, the value of u is increased. In addition, the absolute value of the temperature coefficient ($\tau f$) is not more than approximately 30 ppm/° C., so that a good dielectric ceramic composition having a low temperature coefficient is obtained. Furthermore, the Q value tends to be gradually decreased as the content of strontium oxide is increased.

Table 1 also shows the results of the same measurements made with respect to the samples to be measured containing only SrO out of CaO and SrO, that is, the samples to be measured in which u is 1.00 (sample numbers 5, 10 and 15). As can be seen from the results of the measurements, however, the samples to be measured are not practical because the dielectric constant is high but the Q value is too small.

In the embodiment, the content of strontium oxide is adjusted, thereby to make it possible to obtain a dielectric suitable for a microwave band. In addition, the mixture ratio of strontium oxide to calcium oxide is adjusted as described above, thereby to make it possible to keep the dielectric constant high in a state where the temperature coefficient is held low and further to make the Q value large.

When the microwave dielectric ceramic composition having the composition according to the present embodiment is used for an electronic component such as a resonator, therefore, the content of strontium oxide is suitably selected, thereby to make it possible to obtain an electronic component having parameters such as a dielectric constant, a Q value and a temperature coefficient which are most suitably adjusted.

The ranges of w, x, y and z in the composition formula of the microwave dielectric ceramic composition according to the present embodiment can be respectively 0 mole % $< w <$ 100 mole %, 0 mole % $< x <$ 100 mole %, 0 mole % $< y <$ 100 mole %, and 0 mole % $< z <$ 100 mole %, where $w + x + y + z = 100$ mole %. Particularly, when the ranges of w, x, y and z are respectively 0.0 mole % $< w \leq$ 25.0 mole %, 0.0 mole % $< x \leq$ 50.0 mole %, 0.0 mole % $< y \leq$ 20.0 mole %, and 0.0 mole % $< z \leq$ 80.0 mole %, and the range of u is $0.0 < u < 1.0$, a more favorable microwave dielectric ceramic composition is obtained.

Even when strontium oxide according to the present embodiment is replaced with barium oxide or the like, it is possible to expect the same effect produced when strontium oxide is used.

Description is now made of a microwave dielectric ceramic composition according to another suitable embodiment of the present invention which is expressed by a composition formula of $w \cdot Li_2O - x \cdot \{(1 - u) \cdot CaO - u \cdot Na_2O\} - y \cdot Sm_2O_3 - z \cdot TiO_2$.

First, powders of $Li_2CO$, $CaCO_3$, $SrCO_3$, $Sm_2O_3$ and $TiO_2$ which are raw materials were weighed and mixed so as to be predetermined molar fractions, respectively.

For example, as shown in a column of a sample number 25 in the following table 2, the powders are so weighed and mixed that the ratio u of CaO to $Na_2O$ is 0.4, and the respective molar fractions w, x, y and z of $Li_2O$, the sum of CaO and SrO, $Sm_2O_3$ and $TiO_2$ are 8 mole %, 16 mole %, 13 mole % and 63 mole %.

Thereafter, the powders were subjected to mixture, calcination, grinding, granulation, classification, formation and polishing as in the above described embodiment, to obtain a sample to be measured, and the dielectric constant ($\epsilon r$), the Q value and the temperature coefficient of resonance frequency ($\tau f$) in the neighborhood of the measurement frequency of 3 GHz were measured using the Hakki-Coleman method with respect to the sample to be measured. The results of the measurements are shown in Table 2.

Samples to be measured which differ in mixture ratio as shown in respective columns of the other sample numbers in Table 2 were prepared in the same manner, and the dielectric constant ($\epsilon r$), the value and the temperature coefficient of resonance frequency ($\tau f$) in the neighborhood of the measurement frequency of 3 GHz were measured using the Hakki-Coleman method with respect to the samples to be measured. Table 2 also shows the results of the measurements.

TABLE 2

Dielectric Properties of Ceramics of a $w \cdot Li_2O - x \cdot \{(1 - u) \cdot CaO - u \cdot Na_2O\} - y \cdot Sm_2O_3 - z \cdot TiO_2$ System

| sample number | u | composition ratio (mole %) | | | | $\epsilon r$ | Q | $\tau f$ |
| --- | --- | --- | --- | --- | --- | --- | --- | --- |
| | | w | x | y | z | | | |
| 16* | 0.0 | 7 | 17 | 13 | 63 | 98 | 1970 | −16 |
| 17 | 0.1 | 7 | 17 | 13 | 63 | 105 | 1770 | +46 |
| 18 | 0.4 | 7 | 17 | 13 | 63 | 105 | 590 | +165 |
| 19* | 0.7 | 7 | 17 | 13 | 63 | 96 | 900 | +203 |
| 20* | 0.0 | 9 | 16 | 12 | 63 | 105 | 1550 | −4 |
| 21 | 0.1 | 9 | 16 | 12 | 63 | 109 | 1500 | +47 |
| 22* | 0.7 | 9 | 16 | 12 | 63 | 90 | 870 | +118 |
| 23* | 0.0 | 8 | 16 | 12 | 63 | 99 | 1910 | −31 |
| 24 | 0.1 | 8 | 16 | 13 | 63 | 104 | 1790 | +9 |
| 25 | 0.4 | 8 | 16 | 13 | 63 | 111 | 710 | +155 |
| 26* | 0.7 | 8 | 16 | 13 | 63 | 97 | 1160 | +210 |

Note) In table 2, asterisked samples are samples beyond the range of the present invention, and the unit of $\tau f$ is ppm/°C.

As can be seen from Table 2, the dielectric constant ($\epsilon r$) is increased as the content of sodium oxide is increased, that is, the value of u is increased. In addition, the absolute value of the temperature coefficient ($\tau f$) and the Q value have a significant tendency to be increased and decreased, respectively, as the content of sodium oxide is increased.

When the microwave dielectric ceramic composition having the composition according to the present embodiment is used for an electronic component such as a resonator, therefore, the content of sodium oxide is suitably selected, thereby to make it possible to manufacture an electronic component having parameters such as a dielectric constant ($\epsilon$), a Q value and a temperature coefficient ($\tau f$) which are the most suitable.

w, x, y and z for determining the composition of the microwave dielectric ceramic composition according to the present embodiment can be respectively selected in the ranges of 0 mole % < w < 100 mole %, and 0 mole % < x < 100 mole 0 mole % < y < 100 mole %, and 0 mole % < z < 100 mole %, where w+x+y+z = 100 mole %. Preferably, w, x, y and z are respectively in the ranges of 0.0 mole % < w $\leq$ 25.0 mole %, 0.0 mole % < x $\leq$ 50.0 mole %, 0.0 mole % < y $\leq$ 20.0 mole %, and 0.0 mole % < z $\leq$ 80.0 mole %, and u is in the range of 0.0 < u < 0.7.

The reason why u is in the range of 0.0 < u < 0.7 is that there occurs such a phenomenon that the dielectric constant ($\epsilon r$) is decreased and the temperature coefficient ($\tau f$) is increased if u is not less than 0.7, as apparent from Table 2.

Even when sodium oxide according to the present embodiment is replaced with potassium oxide or the like, it is possible to expect the same effect as the effect produced when sodium oxide is used.

A microwave dielectric ceramic composition according to still another embodiment of the present invention is expressed by a composition formula of w·Li$_2$O - x·{(1 - u)·CaO - u·PbO} - y·A$_2$O$_3$ - z·TiO$_2$. In this composition formula, A is samarium (Sm) or neodymium (Nd).

In manufacturing processes of the microwave dielectric ceramic composition according to the present embodiment, powders of Li$_2$CO, CaCO$_3$, Pb$_3$O$_4$, Sm$_2$O$_3$ and TiO$_2$ which are raw materials were first weighed and mixed so as to be predetermined molar fractions, respectively.

For example, as shown in a column of a sample number 28 in the following table 3, the powders are so weighed and mixed that the ratio u of CaO to Pb$_3$O$_4$ is 0.09, and the respective molar fractions w, x, y and z of Li$_2$O, a mixture of CaO and PbO, Sm$_2$O$_3$ and TiO$_2$ are 9 mole %, 16 mole %, 12 mole % and 63 mole %.

Thereafter, the powders were subjected to mixture, calcination, grinding, granulation, classification, formation and polishing as in the above described respective embodiments, to obtain a sample to be measured.

Samples to be measured having compositions shown in respective columns of sample numbers 27 and 29 to 35 in Table 3 were prepared in the same manner, and the dielectric constant ($\epsilon r$), the Q value and the temperature coefficient of resonance frequency ($\tau f$) in the neighborhood of the measurement frequency of 3 GHz were measured with respect to the samples to be measured. Table 3 also shows the results of the measurements.

TABLE 3

Dielectric Properties of Ceramics of a w · Li$_2$O - x · {(1 - u) · CaO - u · PbO} - y · A$_2$O$_3$ - z · TiO$_2$ System

| sample number | u | composition ratio (mole %) | | | | $\epsilon r$ | Q | $\tau f$ |
|---|---|---|---|---|---|---|---|---|
| | | w | x | y | z | | | |
| A = Sm | | | | | | | | |
| 27* | 0.00 | 9 | 16 | 12 | 63 | 105 | 1550 | −4 |

TABLE 3-continued

Dielectric Properties of Ceramics of a w · Li$_2$O - x · {(1 - u) · CaO - u · PbO} - y · A$_2$O$_3$ - z · TiO$_2$ System

| sample number | u | composition ratio (mole %) | | | | $\epsilon r$ | Q | $\tau f$ |
|---|---|---|---|---|---|---|---|---|
| | | w | x | y | z | | | |
| 28 | 0.09 | 9 | 16 | 12 | 63 | 121 | 1060 | 22 |
| 29 | 0.19 | 9 | 16 | 12 | 63 | 138 | 640 | 36 |
| 30 | 0.45 | 9 | 16 | 12 | 63 | 142 | 530 | 48 |
| 31* | 0.00 | 7 | 17 | 13 | 63 | 98 | 1970 | −16 |
| 32 | 0.09 | 7 | 17 | 13 | 63 | 101 | 1575 | −26 |
| 33 | 0.18 | 7 | 17 | 13 | 63 | 112 | 1100 | 14 |
| 34 | 0.45 | 7 | 17 | 13 | 63 | 119 | 980 | 25 |
| 35 | 0.90 | 7 | 17 | 13 | 63 | 136 | 620 | 41 |
| A = Nd | | | | | | | | |
| 36* | 0.00 | 3.5 | 8 | 18 | 70.5 | 94 | 1540 | −3 |
| 37 | 0.06 | 3.5 | 8 | 18 | 70.5 | 95 | 1260 | 7 |
| 38 | 0.13 | 3.5 | 8 | 18 | 70.5 | 94 | 1360 | 3 |
| 39 | 0.19 | 3.5 | 8 | 18 | 70.5 | 96 | 1180 | 9 |
| 40 | 0.25 | 3.5 | 8 | 18 | 70.5 | 98 | 1120 | 13 |
| 41 | 0.50 | 3.5 | 8 | 18 | 70.5 | 100 | 1010 | 15 |
| 42 | 0.75 | 3.5 | 8 | 18 | 70.5 | 103 | 900 | 19 |
| 43 | 0.91 | 3.5 | 8 | 18 | 70.5 | 107 | 760 | 21 |

Note) In table 3, asterisked samples are samples beyond the range of the present invention, and the unit of $\tau f$ is ppm/°C.

Furthermore, in the present embodiment, Sm$_2$O$_3$ used as a raw material is replaced with Nd$_2$O$_3$, thereby to prepare samples to be measured having compositions shown in respective columns of sample numbers 36 to 43 in Table 3 in which Nd is used in place of Sm. The dielectric constant ($\epsilon r$), the Q value, and the temperature coefficient of resonance frequency ($\tau f$) in the neighborhood of the measurement frequency of 3 GHz were measured with respect to the samples to be measured. Table 3 also shows the results of the measurements.

As can be seen from Table 3, the dielectric constant ($\epsilon r$) is increased as the content of lead oxide is increased. In addition, as can be seen by referring to the temperature coefficient ($\tau f$), the absolute value thereof is small, i.e., not more than approximately 50 ppm/°C., so that a good ceramic composition is obtained in the present embodiment. Furthermore, by referring to the Q value, it has a significant tendency to be gradually decreased as the content of lead oxide is increased.

When the microwave dielectric ceramic composition having the composition according to the present embodiment is used for an electronic component such as a resonator, therefore, the content of lead oxide is suitably selected in consideration of the above described tendency, thereby to make it possible to manufacture an electronic component having parameters such as a dielectric constant ($\epsilon$), a Q value and a temperature coefficient ($\tau f$) which are the most suitable.

The ranges of w, x, y and z in the composition formula of the microwave dielectric ceramic composition according to the present embodiment may be respectively 0 mole % < w < 100 mole %, 0 mole % < x < 100 mole %, 0 mole % < y < 100 mole %, and 0 mole % < z < 100 mole %, where w+x+y+z = 100 mole %. Preferably, the ranges of w, x, y and z are respectively 0.0 mole % < w $\leq$ 25.0 mole %, 0.0 mole % < x $\leq$ 50.0 mole %, 0.0 mole % < y $\leq$ 30.0 mole %, and 0.0 mole % < z $\leq$ 80.0 mole %. In addition, the range of u is 0.0 < u < 1.0.

A microwave dielectric ceramic composition according to a further embodiment of the present invention is expressed by a composition formula of w·Li$_2$O - x·CaO - y·{(1 - u)·Sm$_2$O$_3$ - u·A$_2$O$_3$} - z·TiO$_2$. A in the composition formula is neodymium (Nd), lanthanum (La) or praseodymium (Pr).

In manufacturing processes of the microwave dielectric ceramic composition according to the present embodiment, powders of $Li_2CO_3$, $CaCO_3$, $La_2O_3$, $Sm_2O_3$ and $TiO_2$ which are raw materials were first weighed and mixed so as to be predetermined molar fractions, respectively.

For example, as shown in a column of a sample number 51 in the following table 4, the powders are so weighed and mixed that the respective molar fractions w, x, y and z of $Li_2CO_3$, $CaCO_3$, a mixture of $Sm_2O_3$ and $La_2O_3$ and $TiO_2$ are 9 mole %, 16 mole %, 12 mole % and 63 mole %.

Thereafter, the powders were subjected to mixture, calcination, grinding, granulation, classification, formation and polishing as in the above described respective embodiments, to obtain a sample to be measured, and the dielectric constant ($\epsilon r$), the Q value and the temperature coefficient of resonance frequency ($\tau f$) in the neighborhood of the measurement frequency of 3 GHz were measured using the Hakki-Coleman method with respect to the sample to be measured. The results of the measurements are shown in Table 4.

Samples to be measured having compositions shown in respective columns of sample numbers 44 to 50 and 52 to 60 in Table 4 were prepared in the same manner, and the dielectric constant ($\epsilon r$), the Q value and the temperature coefficient of resonance frequency ($\tau f$) in the neighborhood of the measurement frequency of 3 GHz were measured using the Hakki-Coleman method with respect to the samples to be measured. Table 4 also shows the results of the measurements.

TABLE 4

Dielectric Properties of Ceramics of a $w \cdot Li_2O - x \cdot CaO - y \{(1 - u) \cdot Sm_2O_3 - u \cdot La_2O_3\} - z \cdot TiO_2$ System

| sample number | u | composition ratio (mole %) | | | | $\epsilon r$ | Q | $\tau f$ |
|---|---|---|---|---|---|---|---|---|
| | | w | x | y | z | | | |
| 44* | 0.00 | 7 | 17 | 13 | 63 | 98 | 1950 | +7 |
| 45 | 0.04 | 7 | 17 | 13 | 63 | 101 | 1600 | +17 |
| 46 | 0.11 | 7 | 17 | 13 | 63 | 103 | 1450 | +19 |
| 47 | 0.23 | 7 | 17 | 13 | 63 | 108 | 1150 | +23 |
| 48 | 0.50 | 7 | 17 | 13 | 63 | 115 | 850 | +29 |
| 49 | 0.70 | 7 | 17 | 13 | 63 | 120 | 430 | +37 |
| 50* | 0.00 | 9 | 16 | 12 | 63 | 105 | 1550 | +10 |
| 51 | 0.04 | 9 | 16 | 12 | 63 | 109 | 1520 | +11 |
| 52 | 0.13 | 9 | 16 | 12 | 63 | 115 | 1250 | +21 |
| 53 | 0.25 | 9 | 16 | 12 | 63 | 120 | 1150 | +25 |
| 54 | 0.50 | 9 | 16 | 12 | 63 | 127 | 990 | +29 |
| 55 | 0.75 | 9 | 16 | 12 | 63 | 139 | 370 | +40 |
| 56* | 0.00 | 8 | 16 | 13 | 63 | 98 | 1970 | −29 |
| 57 | 0.05 | 8 | 16 | 13 | 63 | 104 | 1560 | −21 |
| 58 | 0.11 | 8 | 16 | 13 | 63 | 108 | 1420 | −17 |
| 59 | 0.25 | 8 | 16 | 13 | 63 | 114 | 1050 | −13 |
| 60 | 0.75 | 8 | 16 | 13 | 63 | 125 | 470 | −10 |

Note) In Table 4, asterisked samples are samples beyond the range of the present invention, and the unit of $\tau f$ is ppm/°C.

As can be seen from Table 4, the dielectric constant ($\epsilon r$) is gradually increased as the content of lanthanum oxide is increased, that is, the value of u is increased. In addition, the absolute value of the temperature coefficient ($\tau f$) is small, i.e., not more than approximately 40 ppm/° C., so that a good ceramic composition is obtained in the present embodiment. Furthermore, the Q value tends to be gradually decreased as the content of lanthanum oxide is increased.

The ranges of w, x, y and z in the composition formula of the microwave dielectric ceramic composition according to the present embodiment may be respectively 0 mole % < w < 100 mole %, 0 mole % < x < 100 mole %, 0 mole % < y < 100 mole %, and 0 mole % < z < 100 mole %, where w+x+y+z=100 mole %. Preferably, the ranges of w, x, y and z are respectively 0.0 mole % < w ≦ 25.0 mole %, 0.0 mole % < x ≦ 50.0 mole %, 0.0 mole % < y ≦ 30.0 mole %, and 0.0 mole % < z ≦ 80.0 mole %. In addition, the range of u is 0.0 < u < 1.0.

In manufacturing processing of the microwave dielectric ceramic composition according to the present embodiment, if $La_2O_3$ which is a raw material is replaced with $Pr_2O_3$, a microwave dielectric ceramic composition in which A is Pr is obtained. On the other hand, if $La_2O_3$ which is a raw material is replaced with $Nd_2O_3$, a microwave dielectric ceramic composition in which A is Nd is obtained.

Even in the microwave dielectric ceramic composition in which A is Pr or Nd, the same effect as the effect produced when A is La is obtained, as shown in Table 5 or Table 6.

TABLE 5

Dielectric Properties of Ceramics of a $w \cdot Li_2O - x \cdot CaO - y \cdot \{(1 - u) \cdot Sm_2O_3 - u \cdot Pr_2O_3\} - z \cdot TiO_2$ System

| sample number | u | composition ratio (mole %) | | | | $\epsilon r$ | Q | $\tau f$ |
|---|---|---|---|---|---|---|---|---|
| | | w | x | y | z | | | |
| 61* | 0.00 | 7 | 17 | 13 | 63 | 98 | 1950 | +7 |
| 62 | 0.04 | 7 | 17 | 13 | 63 | 100 | 1750 | +12 |
| 63 | 0.11 | 7 | 17 | 13 | 63 | 102 | 1550 | +15 |
| 64 | 0.23 | 7 | 17 | 13 | 63 | 105 | 1370 | +20 |
| 65 | 0.50 | 7 | 17 | 13 | 63 | 112 | 950 | +25 |
| 66 | 0.70 | 7 | 17 | 13 | 63 | 118 | 490 | +32 |
| 67* | 0.00 | 9 | 16 | 12 | 63 | 105 | 1550 | +10 |
| 68 | 0.04 | 9 | 16 | 12 | 63 | 107 | 1520 | +11 |
| 69 | 0.13 | 9 | 16 | 12 | 63 | 113 | 1350 | +21 |
| 70 | 0.25 | 9 | 16 | 12 | 63 | 116 | 1150 | +25 |
| 71 | 0.50 | 9 | 16 | 12 | 63 | 123 | 1020 | +29 |
| 72 | 0.75 | 9 | 16 | 12 | 63 | 133 | 410 | +40 |
| 73* | 0.00 | 8 | 16 | 13 | 63 | 98 | 1970 | −29 |
| 74 | 0.05 | 8 | 16 | 13 | 63 | 99 | 1760 | −25 |
| 75 | 0.11 | 8 | 16 | 13 | 63 | 103 | 1650 | −22 |
| 76 | 0.25 | 8 | 16 | 13 | 63 | 107 | 1050 | −13 |
| 77 | 0.75 | 8 | 16 | 13 | 63 | 120 | 510 | −7 |

Note) In Table 5, asterisked samples are samples beyond the range of the present invention, and the unit of $\tau f$ is ppm/°C.

TABLE 6

Dielectric Properties of Ceramics of a $w \cdot Li_2O - x \cdot CaO - y \cdot \{(1 - u) \cdot Sm_2O_3 - u \cdot Nd_2O_3\} - z \cdot TiO_2$ System

| sample number | u | composition ratio (mole %) | | | | $\epsilon r$ | Q | $\tau f$ |
|---|---|---|---|---|---|---|---|---|
| | | w | x | y | z | | | |
| 78* | 0.00 | 11 | 16 | 12 | 61 | 101 | 1720 | −20 |
| 79 | 0.17 | 11 | 16 | 12 | 61 | 107 | 1600 | −11 |
| 80 | 0.33 | 11 | 16 | 12 | 61 | 119 | 1450 | +15 |
| 81 | 0.50 | 11 | 16 | 12 | 61 | 122 | 1300 | +23 |
| 82 | 0.67 | 11 | 16 | 12 | 61 | 126 | 1200 | +25 |
| 83 | 0.83 | 11 | 16 | 12 | 61 | 130 | 1090 | +30 |
| 84 | 1.00 | 11 | 16 | 12 | 61 | 134 | 990 | +36 |
| 85* | 0.00 | 9 | 16 | 12 | 63 | 105 | 1750 | +9 |
| 86 | 0.17 | 9 | 16 | 12 | 63 | 107 | 1470 | +11 |
| 87 | 0.33 | 9 | 16 | 12 | 63 | 110 | 1350 | +21 |
| 88 | 0.50 | 9 | 16 | 12 | 63 | 114 | 1250 | +30 |
| 89 | 0.67 | 9 | 16 | 12 | 63 | 117 | 1100 | +29 |
| 90 | 0.83 | 9 | 16 | 12 | 63 | 119 | 980 | +33 |
| 91* | 1.00 | 9 | 16 | 12 | 63 | 124 | 900 | +34 |
| 92* | 0.05 | 8 | 16 | 13 | 63 | 98 | 1660 | −25 |
| 93 | 0.11 | 8 | 16 | 13 | 63 | 100 | 1500 | −22 |
| 94 | 0.20 | 8 | 16 | 13 | 63 | 102 | 1475 | −19 |
| 95 | 0.27 | 8 | 16 | 13 | 63 | 104 | 1430 | −15 |
| 96* | 0.17 | 8 | 17 | 12 | 63 | 107 | 1680 | +14 |
| 97 | 0.13 | 10 | 17 | 11 | 62 | 100 | 1650 | +20 |

TABLE 6-continued

Dielectric Properties of Ceramics of a w · $Li_2O$ — x · CaO —
y · {(1 − u) · $Sm_2O_3$ − u · $Nd_2O_3$} − z · $TiO_2$ System

| sample number | u | composition ratio (mole %) | | | | $\epsilon r$ | Q | $\tau f$ |
|---|---|---|---|---|---|---|---|---|
| | | w | x | y | z | | | |
| 98 | 0.13 | 12 | 17 | 11 | 60 | 119 | 1500 | +33 |

Note) In Table 6, asterisked samples are samples beyond the range of the present invention, and the unit of $\tau f$ is ppm/°C.

Consequently, when the microwave dielectric ceramic composition having the composition according to the present embodiment is used for an electronic component such as a resonator, the content of lanthanum oxide, neodymium oxide or praseodymium oxide is suitably selected in consideration of the above described tendency, thereby to make it possible to manufacture an electronic component having parameters such as a dielectric constant ($\epsilon$), a Q value and a temperature coefficient ($\tau f$) which are the most suitable.

A microwave dielectric ceramic composition according to a still further embodiment of the present invention is expressed by a composition formula of $w.Li_2O$ - $x CaO$ - $y.A_2O_3$ - $z.TiO_2$. A in the composition formula is praseodymium (Pr) or europium (Eu).

In manufacturing processes of the microwave dielectric ceramic composition according to the present embodiment, powders of $Li_2CO_3$, $CaCO_3$, $Pr_6O_{11}$, $Eu_2O_3$ and $TiO_2$ which are raw materials were first weighed and mixed so as to be predetermined molar fractions, respectively.

For example, as shown in a column of a sample number 102 in the following table 7, the powders are so weighed and mixed that the respective molar fractions w, x, y and z of $Li_2O$, $CaCO_3$, $Eu_2O_3$ and $TiO_2$ are 9 mole %, 16 mole %, 12 mole % and 63 mole %.

Thereafter, the powders were subjected to mixture, calcination, grinding, granulation, classification, formation and polishing as in the above described respective embodiments, to obtain a sample to be measured, and the dielectric constant ($\epsilon r$), the Q value and the temperature coefficient of resonance frequency ($\tau f$) in the neighborhood of the measurement frequency of 3 GHz were measured using the Hakki-Coleman method with respect to the sample to be measured. The results of the measurements are shown in Table 7.

TABLE 7

Dielectric Properties of Ceramics of a w · $Li_2O$ — x · CaO —
y · $A_2O_3$ − z · $TiO_2$ System

| sample number | A | composition ratio (mole %) | | | | $\epsilon e$ | Q | $\tau f$ |
|---|---|---|---|---|---|---|---|---|
| | | w | x | y | z | | | |
| 99 | Pr | 9.00 | 16.0 | 12.0 | 63.0 | 144 | 530 | −30 |
| 100 | Pr | 3.50 | 8.00 | 18.0 | 70.5 | 101 | 690 | −6 |
| 101* | Pr | 16.7 | 0.00 | 16.7 | 66.6 | 92.0 | 340 | −403 |
| 102 | Eu | 9.00 | 16.0 | 12.0 | 63.0 | 94 | 1910 | −26 |
| 103 | Eu | 3.50 | 8.00 | 18.0 | 70.5 | 90 | 860 | −4 |

Note) In Table 7, asterisked samples are samples beyond the range of the present invention, and the unit of $\tau f$ is ppm/°C.

As can be seen from Table 7, the dielectric constant ($\epsilon r$) can be made high if Pr is selected as an element of A, while the Q value can be made large if Eu is selected as an element of A. In addition, the absolute value of the temperature coefficient ($\tau f$) is low, i.e., not more than approximately 30 ppm/° C. even if either element is selected, so that a good ceramic composition is obtained in the present embodiment.

A composition of a sample number 101 in Table 7 is a composition in which CaO is 0 mole %. In this case, the temperature coefficient ($\tau f$) is − 403 ppm/° C. and the absolute value thereof is significantly large, which is not practical.

When the microwave dielectric ceramic composition having the composition according to the present embodiment is used for an electronic component such as a resonator, therefore, an element of A is suitably selected in consideration of the above described tendency in a case where the element of A is changed, thereby to make it possible to manufacture an electronic component having parameters such as a dielectric constant ($\epsilon$), a Q value and a temperature coefficient ($\tau f$) which are the most suitable.

Furthermore, when the microwave dielectric ceramic composition according to the present embodiment is utilized for a microwave, it is fit for practical use even if the dielectric constant is low particularly when the Q value and the temperature coefficient are design parameters.

The ranges of w, x, y and z in the composition formula of the microwave dielectric ceramic composition according to the present embodiment may be respectively 0 mole % < w < 100 mole %, 0 mole % < x < 100 mole %, 0 mole % < y < 100 mole %, and 0 mole % < z < 100 mole %, where w + x + y + z = 100 mole %. Preferably, the ranges of w, x, y and z are respectively 0.0 mole % < w ≦ 25.0 mole %, 0.0 mole % < x ≦ 50.0 mole %, 0.0 mole % < y ≦ 30.0 mole %, and 0.0 mole % < z ≦ 80.0 mole %.

In the present embodiment, the same effect can be expected even if lanthanide (a primary rare earth element) such as praseodymium (Pr) or europium (Eu) are replaced with lanthanide such as lanthanum (La), cerium (Ce), gadolinium (Gd), terbium (Tb), dysprosium (Dy), holmium (Ho), erbium (Er) or ytterbium (Yb).

When the microwave dielectric ceramic compositions according to the embodiments are utilized for a microwave, each of the microwave dielectric ceramic compositions is fit for practical use even if the dielectric constant is low particularly when the Q value and the temperature coefficient are important design parameters.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A microwave dielectric ceramic composition being expressed by a composition formula of w.$Li_2O$ - x.{(1 - u) .CaO - u.AO}- y.$E_2O_3$ - z.$TiO_2$,
   where A is selected from Sr and Pb and E is selected from Sm and Nd, and w, x, y, z and u are in the following ranges:
   0.0 mole % < w ≦ 25.0 mole %,
   0.0 mole % < x ≦ 50.0 mole %,
   0.0 mole % < y ≦ 30.0 mole %,
   0.0 mole % < z ≦ 80.0 mole %,
   w + x + y + z = 100 mole %.
   0.0 < u < 1.0.

2. The microwave dielectric ceramic composition according to claim 1, wherein w, x, y and z are in the following ranges when A is Sr and said E is Sm:
   0.0 mole % < w ≦ 25.0 mole %,
   0.0 mole % < x ≦ 50.0 mole %, 0.0 mole % < y ≦ 20.0 mole %,
0.0 mole % < z ≦ 80.0 mole %.

3. The microwave dielectric ceramic composition according to claim 1, wherein w, x, y and z are in the following ranges when said A is Pb and said E is Sm:
0.0 mole % < w ≦ 25.0 mole %,
0.0 mole % < x ≦ 50.0 mole %,
0.0 mole % < y ≦ 30.0 mole %,
0.0 mole % < z ≦ 80.0 mole %.

4. A microwave dielectric ceramic composition being expressed by a composition formula of $w.Li_2O - x.\{(1-u).CaO - u.Na_2O\} - y.Sm_2O_3 - z.TiO_2$,
where w, x, y, z and u are in the following ranges:
0.0 mole % < w ≦ 25.0 mole %,
0.0 mole % < x ≦ 50.0 mole %,
0.0 mole % < y ≦ 20.0 mole %,
0.0 mole % < z ≦ 80.0 mole %,
w + x + y + z = 100 mole %,
0.0 < u < 0.7.

5. A microwave dielectric ceramic composition being expressed by a composition formula of $w.Li_2O - x.CaO - y.\{(1-u).Sm_2O_3 - u.A_2O_3\} - z.TiO_2$,
where A is selected from Nd, La and Pr, and w, x, y, z and u are in the following ranges:
0.0 mole % < w ≦ 25.0 mole %,
0.0 mole % < x ≦ 50.0 mole %,
0.0 mole % < y ≦ 30.0 mole %,
0.0 mole % < z ≦ 80.0 mole %,
w + x + y + z = 100 mole %.

6. A microwave dielectric ceramic composition being expressed by a composition formula of $w.Li_2O - x.CaO - y.A_2O_3 - z.TiO_2$,
where A is lanthanide, and w, x, y and z are in the following ranges:
0.0 mole % < w ≦ 25.0 mole %,
0.0 mole % < x ≦ 50.0 mole %,
0.0 mole % < y ≦ 30.0 mole %,
0.0 mole % < z ≦ 80.0 mole %,
w + x + y + z = 100 mole %.

7. The microwave dielectric ceramic composition according to claim 6, wherein said A is selected from Pr, Eu, La, Ce, Gd, Tb, Dy, Ho, Er and Yb.

* * * * *